UNITED STATES PATENT OFFICE.

AUSTIN O. ALLEN, OF MERCHANTVILLE, NEW JERSEY, ASSIGNOR TO JOHN LUCAS & CO. INC., OF PHILADELPHIA, PENNSYLVANIA, A CORPORATION OF PENNSYLVANIA.

METHODS OF MANUFACTURING ARSENATE OF LEAD.

1,427,049.    Specification of Letters Patent.    Patented Aug. 22, 1922.

No Drawing.    Application filed June 29, 1921. Serial No. 481,208.

*To all whom it may concern:*

Be it known that I, AUSTIN O. ALLEN, a citizen of the United States, residing in Merchantville, New Jersey, have invented certain Improvements in Methods of Manufacturing Arsenate of Lead, of which the following is a specification.

The object of my invention is to provide an economical method for the manufacture of arsenate of lead in the form of acid arsenate of lead ($PbHAsO_4$) having certain physical properties which render it most suitable for use as an insecticide for the extermination of external leaf eating insects.

Arsenate of lead is in extensive and growing demand as an exterminator of external leaf eating insects which are destructive to plant life. It is an established fact that arsenate of lead of the formulae $PbHAsO_4$ is a quicker and stronger poison than normal arsenate of lead of the formulae $(Pb)_3(AsO_4)_2$. Furthermore for most effective and economical results, an arsenate of lead must be very light and fluffy in order to insure even distribution when used either as a wet spraying or dry dusting material, and also should be composed of exceedingly fine particles so that the individual particles may become lodged in the minute indentations of the surface of fruit or foliage.

By means of my present invention, I am permitted to manufacture a pure acid arsenate of lead or as it is technically known, di-arsenate of lead, possessing physical properties rendering it ideal for use as an insecticide. My acid arsenate of lead further is free from soluble salts, making possible the use therewith of various types of spreaders, since there are no appreciable percentages of soluble salts or free litharge present to enter into combination with them and destroy their function as spreaders. I furthermore am enabled to recover and make use of practically all acids liberated in the process, which makes my method an extremely economical one.

I have found that when arsenate of lead is manufactured from basic acetate of lead, a considerable quantity of normal arsenate of lead is formed according to the following reactions:

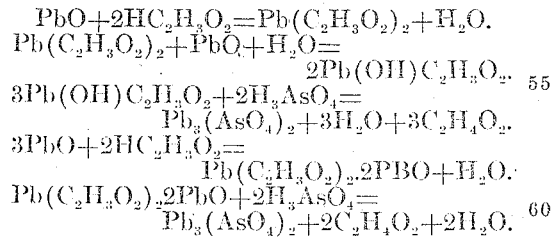

I have also found that there is a strong tendency for acid arsenate of lead to be converted into normal arsenate of lead in the presence of even small amounts of lead acetate (sugar of lead), and that arsenate of lead manufactured from nitrate of lead, while it is a pure acid arsenate of lead, does not have the desired physical properties.

I have discovered that an acid arsenate of lead of the desirable physical properties may be manufactured when the arsenate of lead is precipitated from a basic solution of acetate of lead and nitrate of lead with arsenic acid, under certain definite conditions, and that by the use of definite percentages of basic acetate of lead and nitrate of lead in the solution from which I precipitate the arsenate of lead with arsenic acid and with a definite dilution, temperature and time of precipitation, extremely desirable results are obtainable in the manufacture of a product having all the qualities of the ideal insecticide.

In carrying out my invention, I make use of straight chemical reactions, no catalyzer or material foreign to the reaction being employed, and I have found that the following proportions of materials and mode of procedure will furnish excellent results:

In a tank of suitable size (about 3000 gallons capacity) provided with an agitator. I place about 2000 gallons of water, and add to the water 165 lbs. of 70% acetic acid, which amount of acid is sufficient to convert 640 lbs. of litharge into tri basic acetate of lead in accordance with the following reaction:

$$3PbO + 2HC_2H_3O_2 = Pb(C_2H_3O_2)_2.2PbO + H_2O.$$

I then add 16.5 lbs. of 40° Baumé nitric acid, followed by 640 lbs. of litharge added while the agitator is in operation. The batch is now heated to 120° F., preferably with live steam, and as soon as all the litharge is converted to lead salts, which point can easily be detected by the milky appearance of the solution and the absence of yellowish tinge due to the presence of litharge, I add 515 lbs. of arsenic acid, approximately 63% $As_2O_5$, said acid being added very slowly. Approximately one hour is consumed in adding the entire amount of the arsenic acid. The batch is now allowed to agitate for twenty-five minutes, after which a sample of the filtrate is tested for the presence of lead salts and arsenic acid. For the proper balance, the filtrate should show a very slight trace of lead salts and no arsenic acid, and the desired point can easily be reached by the addition of small amounts of litharge or arsenic acid, as may be necessary. When the material is properly balanced, it is pumped into any desired washing type of filter press and is thoroughly washed, the first part of the wash water being run into the tank with the filtrate until the total volume is approximately 2000 gallons. The cakes of arsenate of lead are then taken from the press, dried and pulverized.

The filtrate from this batch containing acetic acid, nitric acid and small quantities of acetate of lead and nitrate of lead is now pumped into the precipitating tank. Practice has shown that there will be a loss of approximately 3% of the acetic and nitric acids. To this amount, approximately five lbs. of 70% acetic acid and one-half lb. of 40° Baumé nitric acid is added, followed by 640 lbs. of litharge, which latter is added while the agitator is running. The temperature is then raised to 120° F., and the process continued as described above. The process thus becomes continuous, and the loss is very small.

The reactions involved in the process are as follows:

$$3PbO + 2HC_2H_3O_2 = Pb(C_2H_3O_2)_2.2PbO + H_2O.$$
$$Pb(C_2H_3O_2)_2.2PbO + 2H_3AsO_4 = Pb_3(AsO_4)_2 + 2C_2H_4O_2 + 2H_2O.$$
$$PbO + 2HNO_3 = Pb(NO_3)_2 + H_2O.$$
$$Pb_3(AsO_4)_2 + 2HNO_3 = PbHAsO_4 + Pb(NO_3)_2.$$
$$Pb(NO_3)_2 + H_3AsO_4 = PbHAsO_4 + 2HNO_3.$$

The pure acid arsenate of lead of fine fluffy physical properties is made as I have shown above by precipitating arsenate of lead from a basic solution of lead acetate and lead nitrate with arsenic acid, when the percentage of lead nitrate is just sufficient to insure the formation of a pure acid arsenate of lead. The volume in which I precipitate and the temperature and rate of precipitation greatly aid in forming the above desirable product.

I claim:

1. The method of manufacturing acid arsenate of lead, which consists in precipitating the arsenate of lead from a basic solution of the lead salts of acetic acid and nitric acid obtained by mixing 70% acetic acid, 40° Baumé nitric acid, and litharge in the proportions by weight of 10 to 1 to 39 respectively, with arsenic acid of approximately 65° to 70° Baumé or 58% to 63% $As_2O_5$.

2. The method of manufacturing acid arsenate of lead, which consists in precipitating the arsenate of lead from a basic solution of the lead salts of acetic acid and nitric acid, which acids were used in forming the solution in the ratio of approximately 10 parts of 70% acetic acid to 1 part of 40° Baumé or 61.9% nitric acid, with arsenic acid of approximately 58 to 63% $As_2O_5$ content, at a temperature of approximately 120° F.

3. The method of manufacturing acid arsenate of lead, which consists in precipitating the arsenate of lead from a basic solution of the lead salts of acetic and nitric acid, which acids were used in forming the solution in the ratio of 10 parts of 70% acetic acid to 1 part of 40° Baumé or 61.9% nitric acid, with arsenic acid of 58% to 63% $As_2O_5$ content, said precipitation taking place in a dilution of approximately 16 parts by weight of water for each 1 part by weight of the dry arsenate of lead precipitate.

4. The method of manufacturing acid arsenate of lead, which consists in precipitating the arsenate of lead from a basic solution of the lead salts of acetic acid and nitric acid, such acids being used in preparing the solution in the ratio of 10 parts of 70% acetic acid and 1 part 40° Baumé or 61.9% nitric acid, with arsenic acid of approximately 58% to 63% $As_2O_5$ content, charging the filtrate and washings with sufficient acetic acid and nitric acid in the ratio of 10 parts of the former to 1 part of the latter to convert an additional charge of litharge to basic acetate of lead and nitrate of lead, substantially as and for the purpose set forth.

AUSTIN O. ALLEN.